US007611259B2

(12) United States Patent
Tseng

(10) Patent No.: US 7,611,259 B2
(45) Date of Patent: Nov. 3, 2009

(54) LIGHT ASSEMBLY HAVING CHANGING LIGHT

(76) Inventor: Shen Ko Tseng, No. 157, Lane 75, Sec. 5, Kannin Road, Taipei 11485 (TW)

( * ) Notice: Subject to any disclaimer, the term of this patent is extended or adjusted under 35 U.S.C. 154(b) by 0 days.

(21) Appl. No.: 11/388,955

(22) Filed: Dec. 28, 2005

(65) Prior Publication Data

US 2007/0236925 A1 Oct. 11, 2007

(51) Int. Cl.

*F21L 4/02* (2006.01)
*F21V 33/00* (2006.01)
*F21V 21/08* (2006.01)
*G02B 6/04* (2006.01)
*F21V 29/00* (2006.01)

(52) U.S. Cl. ....................... 362/184; 362/103; 362/554; 362/249.05; 362/249.13; 362/295

(58) Field of Classification Search ................. 362/184, 362/103, 554, 212, 251, 802, 252, 249.05, 362/249.12, 249.13, 295
See application file for complete search history.

(56) References Cited

U.S. PATENT DOCUMENTS 5,457,900 A * 10/1995 Roy ............................ 36/137
5,709,464 A 1/1998 Tseng ........................ 362/276
5,812,063 A * 9/1998 Weng et al. ............ 340/815.45
5,813,148 A * 9/1998 Guerra ........................ 36/137
5,932,975 A * 8/1999 Wut ........................... 315/119
6,239,774 B1 * 5/2001 Altman ........................ 345/31
6,525,487 B2 * 2/2003 Wei ........................ 315/200 A
6,776,498 B2 * 8/2004 Yeung ........................ 362/103
6,789,913 B2 * 9/2004 Wei ............................ 362/103
6,882,117 B1 * 4/2005 Hughes et al. .............. 315/291
7,029,140 B2 * 4/2006 Wong et al. ................. 362/103
7,067,986 B2 * 6/2006 Wong et al. ............. 315/200 A
7,170,019 B2 * 1/2007 Wong et al. .......... 200/61.45 M
7,207,688 B2 * 4/2007 Yuen et al. .................. 362/103
7,262,557 B1 * 8/2007 Wang ..................... 315/200 A
7,298,090 B2 * 11/2007 Tseng ......................... 315/51
7,393,118 B2 * 7/2008 Tseng ........................ 362/157
2004/0150994 A1 * 8/2004 Kazar et al. ................. 362/251
2007/0235630 A1 * 10/2007 Tseng ........................ 250/205

* cited by examiner

*Primary Examiner*—Jong-Suk (James) Lee
*Assistant Examiner*—David J Makiya
(74) *Attorney, Agent, or Firm*—Banger Shia

(57) ABSTRACT

A light facility includes one or more batteries disposed in a housing, a processor device includes two power terminals coupled to the batteries and includes a switch terminal and a key terminal and three light terminals, a light device may be energized by the battery and includes a red light member, a green light member, and a blue light member coupled to the three light terminals of the processor device for being operated to generate red light, green light, and blue light, a switch is selectively coupled to either the switch terminal or the key terminal of the processor device for actuating the light device to generate lights, or gradually darkened light, or gradually brightened light.

5 Claims, 10 Drawing Sheets

LIGHT ASSEMBLY HAVING CHANGING LIGHT

BACKGROUND OF THE INVENTION

1. Field of the Invention

The present invention relates to a light assembly, and more particularly to a light assembly having a light control or changing device or structure for controlling or actuating the light assembly to generate various light colors and/or to generate various light flashing or emitting modes or processes.

2. Description of the Prior Art

Typical light devices comprise one or more light bulbs or light emitting diodes energized by one or more batteries and controlled by one or more switches for controlling or actuating the light device to generate indicating or warning lights.

For example, the applicant has also developed a typical light device which is issued as U.S. Pat. No. 5,709,464 to Tseng and which also comprises one or more light bulbs or light emitting diodes or light members energized by one or more batteries and controlled by one or more switches, and a vibrating switch is coupled to the integrated circuit for controlling or actuating the light device to generate indicating or warning lights.

The light members may be switched on and switched off or controlled by the vibrating switch, but the light members may not be controlled to generate lights of different time intervals. In addition, the light members also may not be controlled to generate lights of different light intensity or brightness or the like.

The present invention has arisen to mitigate and/or obviate the afore-described disadvantages of the conventional light devices.

SUMMARY OF THE INVENTION

The primary objective of the present invention is to provide a light assembly including a light control or changing device or structure for controlling or actuating the light assembly to generate various light colors and/or to generate various light flashing or emitting modes or processes.

The other objective of the present invention is to provide a light assembly including a light device having a red light member, a green light member, and a blue light member for being operated to generate red light, green light, and blue light respectively.

In accordance with one aspect of the invention, there is provided a light assembly comprising a housing, at least one battery disposed in the housing, a processor device including two power terminals VDD, VSS for coupling to the battery and for receiving an electric energy from the battery, and including a switch terminal SW and a key terminal KEY, and including three light terminals RL, GL, BL, a light device coupled to the battery for being energized by the battery, the light device including a red light member, a green light member, and a blue light member coupled to the three light terminals RL, GL, BL of the processor device respectively for being operated by the processor device to generate red light, green light, and blue light respectively, and a switch selectively coupled to either the switch terminal SW or the key terminal KEY of the processor device for actuating the light device to generate lights, or gradually darkened light, or gradually brightened light.

The red light member and the green light member and the blue light member of the light device are each coupled to the light terminals RL, GL, BL of the processor device with a resistor respectively.

The processor device includes an oscillating input terminal OSCI and an oscillating output terminal OSCO, and includes a resistor selectively coupled between the oscillating input terminal OSCI and the oscillating output terminal OSCO for actuating the light device to generate and to flash the lights in a faster speed. A capacitor may be selectively coupled to the oscillating input terminal OSCI of the processor device for actuating the light device to generate and to flash the lights in a slower speed.

The light guiding device may include a number of light tubes attached onto said light device and extended radially from said light device for refracting the lights and for generating different light patterns or forms.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
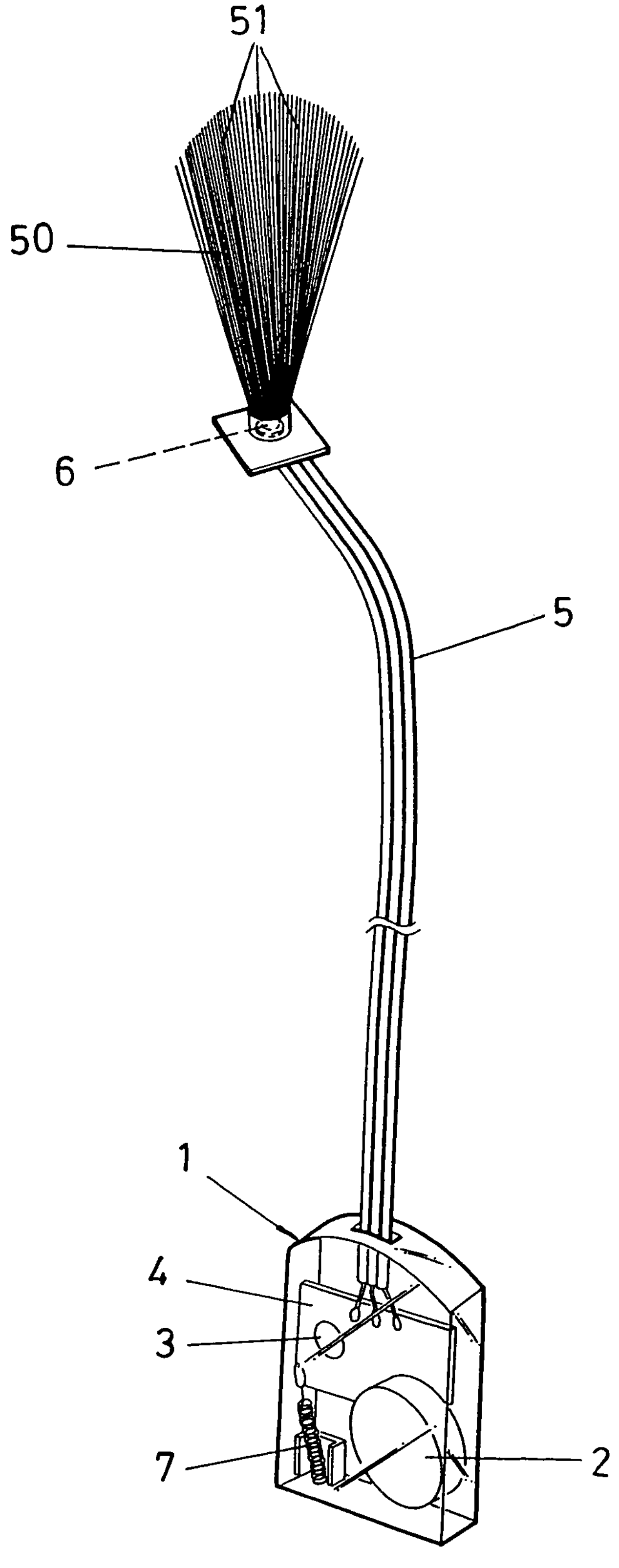
FIG. 1 is a perspective view of a light assembly in accordance with the present invention.

Referring to the drawings, and initially to FIG. 1, a light assembly in accordance with the present invention comprises a housing 1, one or more batteries 2 disposed in the housing 1, an integrated circuit or control circuit or processor device 3 disposed on a circuit board 4 which is also disposed in the housing 1, a light device 6 coupled to the batteries 2 and coupled to the circuit board 4, such as coupled to the processor device 3 of the circuit board 4 with one or more electric wires or cables 5 for being selectively energized by the batteries 2, and a switch 7, such as a vibrating switch 7 also coupled to the circuit board 4, such as coupled to the processor device 3 of the circuit board 4 for controlling or actuating the light device 6 to selectively generate indicating or warning lights.

Figure 17:
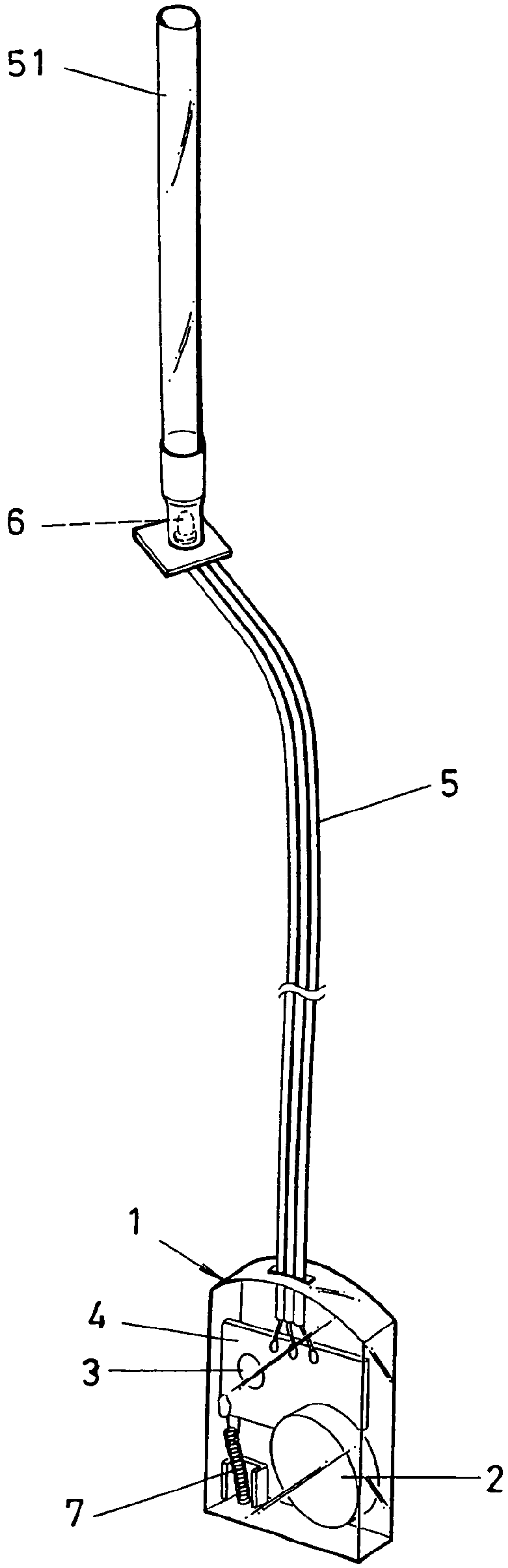
FIG. 17 is a perspective view similar to FIG. 1, illustrating the other arrangement of the light element of the light assembly.

The light assembly in accordance with the present invention further comprises a light guiding device 50 attached or engaged onto the light device 6 for guiding or directing the lights, or for transmitting the lights, or for refracting the lights generated by the light device 6. For example, as shown in FIG. 1, the light guiding device 50 may include a number or a bundle of light rods or tubes 51 attached or engaged onto the light device 6 and extended radially from the light device 6 for refracting the lights and for generating different light patterns or forms. Alternatively, as shown in FIG. 17, the light guiding device 50 may include a single or a greater light rod or tube 51 attached or engaged onto the light device 6 for generating different light patterns or forms.

As shown in FIGS. 2-4 and 18-19, the processor device 3 includes two power terminals VDD, VSS or 31, 32 for coupling to the batteries 2 and for receiving the electric power or energy from the batteries 2, and includes a switch terminal SW or 33 for selectively coupling to the switch 7 (FIGS. 2-3 and 20), and includes a key terminal KEY or 34 for selectively coupling to the switch 7 (FIGS. 4 and 18-19), in which the switch 7 may be selectively coupled to either the switch terminal SW or 33 or the key terminal KEY or 34 for controlling or actuating the processor device 3 to actuating the light device 6 to selectively generate flashing lights, intermittent flashing lights, lights gradually diminishing or darkening, lights gradually brightening, etc.

Figure 2:
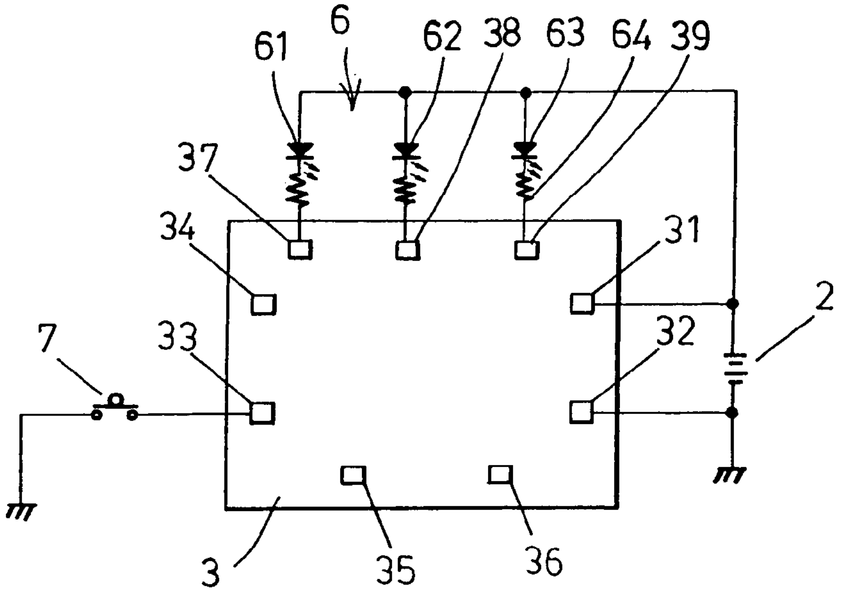
FIG. 2 is a plan schematic view illustrating an electric circuit of the light assembly.
Figure 3:
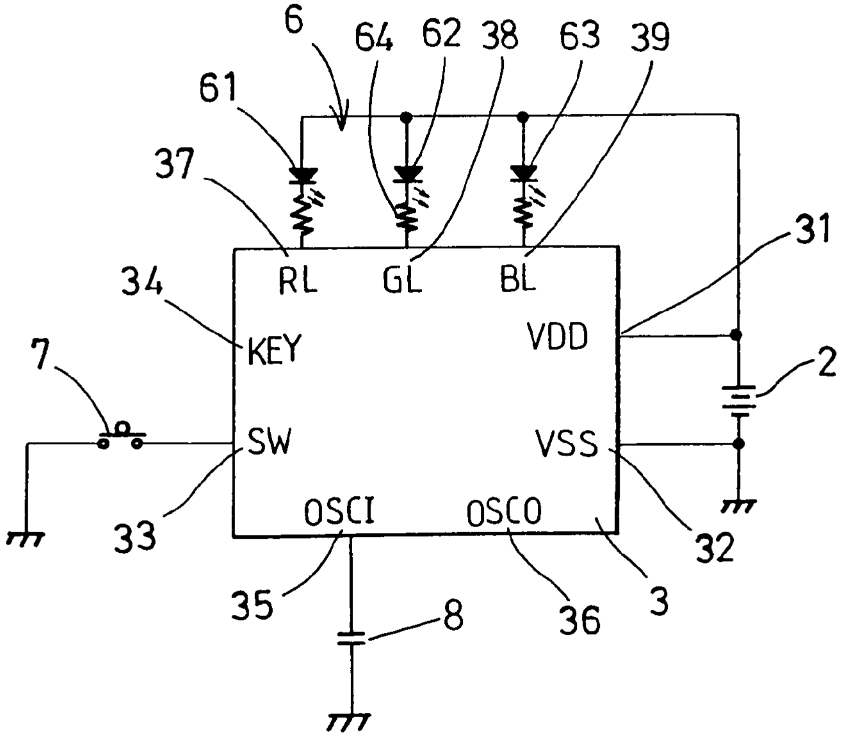
FIG. 3 is a further plan schematic view similar to FIG. 2, illustrating the other arrangement of the electric circuit of the light assembly.
Figure 18:
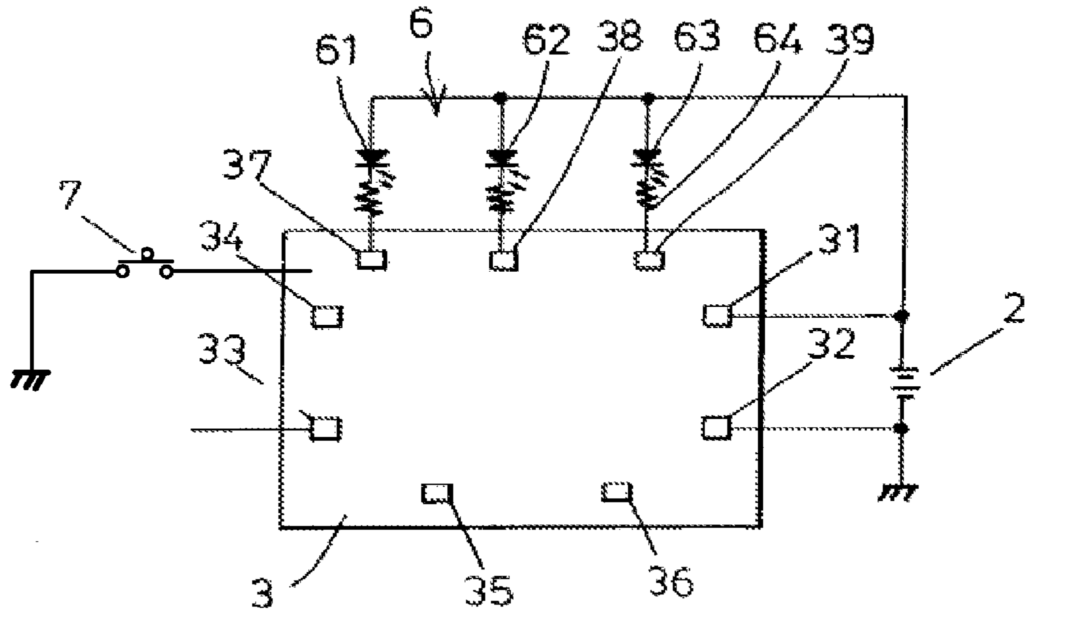
FIG. 18 is a plan schematic view illustrating an electric circuit of the light assembly.
Figure 19:
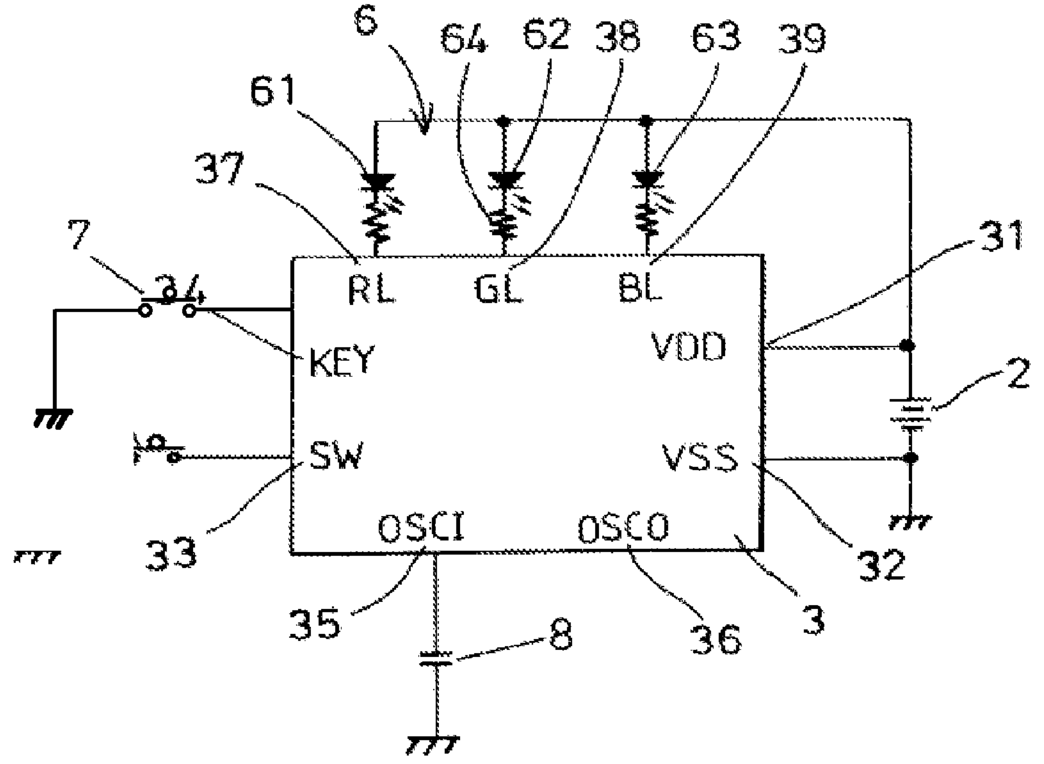
FIG. 19 is a further plan schematic view similar to FIG. 18, illustrating the other arrangement of the electric circuit of the light assembly.

The processor device 3 further includes an oscillating input terminal OSCI or 35 and an oscillating output terminal OSCO or 36, and includes three light terminals RL, GL, BL or 37, 38, 39 for coupling to the light device 6. As shown in FIGS. 2 and 18, the light device 6 may generate the lights intermittently or may generate the lights to flash in the normal or average speed when no other members or elements are coupled to the oscillating input terminal OSCI or 35 and an oscillating output terminal OSCO or 36. As shown in FIGS. 3 and 19, when a capacitor 8 is coupled to the oscillating input terminal OSCI or 35, the light device 6 may generate the lights to flash in a speed slower than that shown in FIGS. 2 and 18.

Figure 4:
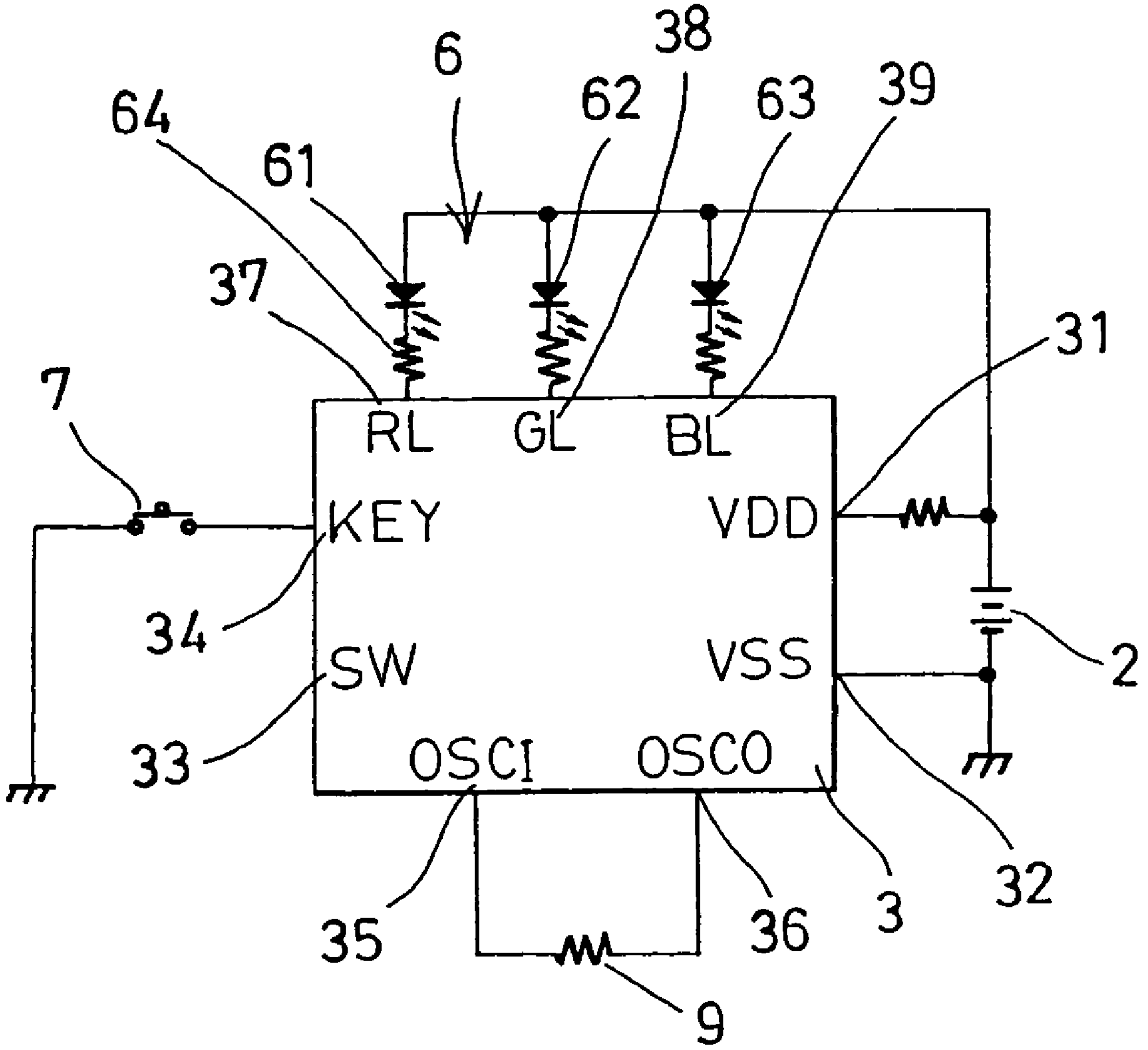
FIG. 4 is a still further plan schematic view similar to FIGS. 2 and 3, illustrating the further arrangement of the electric circuit of the light assembly.
Figure 20:
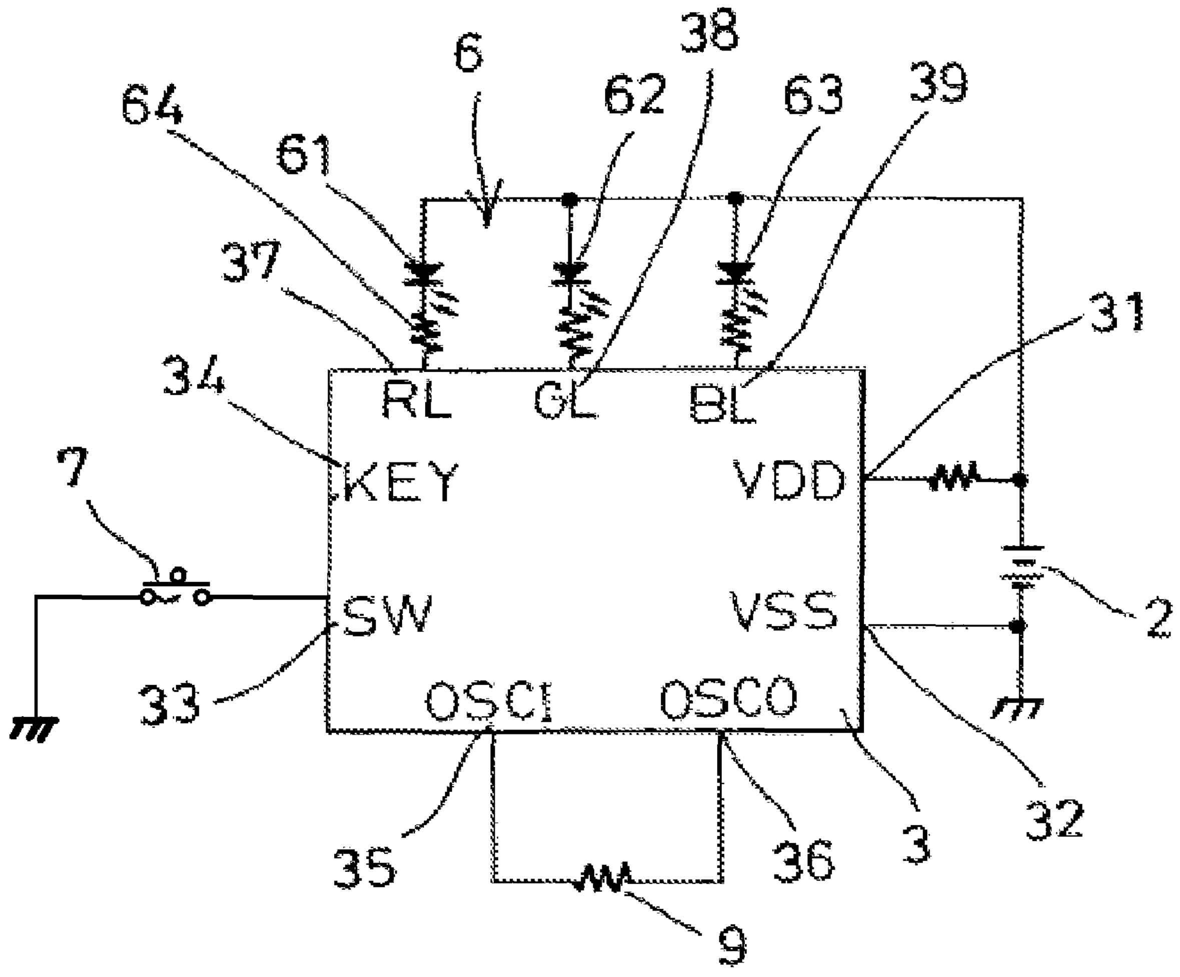
FIG. 20 is a still further plan schematic view similar to FIGS. 18 and 19, illustrating the further arrangement of the electric circuit of the light assembly.

Alternatively, as shown in FIGS. 4 and 20, when a resistor 9 is coupled in series between the oscillating input terminal OSCI or 35 and the oscillating output terminal OSCO or 36, the light device 6 may generate the lights to flash in a speed faster than that shown in FIGS. 2 and 3. The light device 6 includes a red light chip or transistor or member 61, a green light chip or transistor or member 62, and a blue light chip or transistor or member 63 each coupled to the three terminals RL, GL, BL or 37, 38, 39 of the processor device 3 respectively with a resistor 64, for being operated or actuated by the processor device 3 to generate red light, green light, and blue light respectively.

Figure 5:
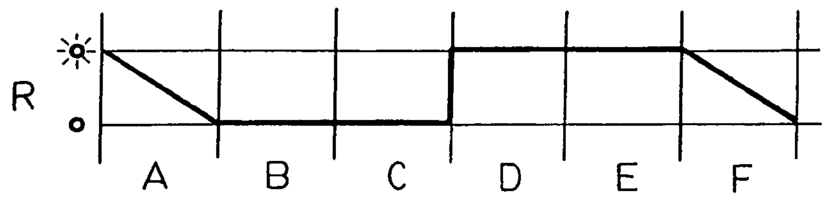
FIGS. 5, 6, 7 are plan schematic views illustrating the operation of the light members of the light assembly.
Figure 6:
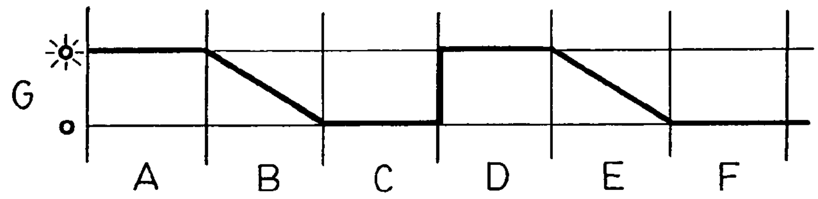
Figure 7:
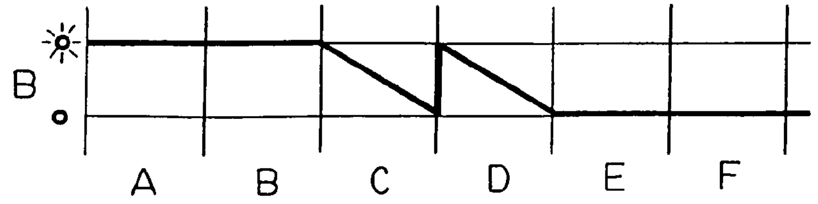

In operation, as shown in FIGS. 5-7, illustrated is one of the flashing modes of the light assembly in accordance with the present invention, in this flashing mode, the light members 61-63 may be operated or actuated by the processor device 3 to generate red light, green light, and blue light respectively and simultaneously, and the red light member 61 will be gradually diminished or darkened in the first time segment or interval A, the green light member 62 will then be gradually diminished or darkened in the second time segment or interval B, and the blue light member 63 will then be gradually diminished or darkened in the third time segment or interval C, and the light members 61-63 may generate the lights cyclically.

After the light members 61-63 have been alternatively diminished or darkened in the three time segments or intervals A-C, the light members 61-63 may be operated or actuated to generate the lights simultaneously again, but the blue light member 63 will then be gradually diminished or darkened in the fourth time segment or interval D, the green light member 62 will then be gradually diminished or darkened in the fifth time segment or interval E, and the red light member 61 will then be gradually diminished or darkened in the sixth time segment or interval F, and then generate the lights cyclically.

Figure 8:
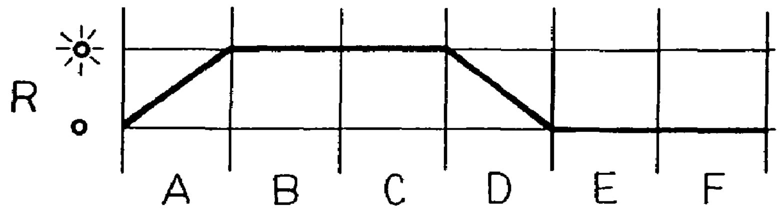
FIGS. 8, 9, 10 are plan schematic views similar to FIGS. 5-7, illustrating the other operation of the light members of the light assembly.
Figure 9:
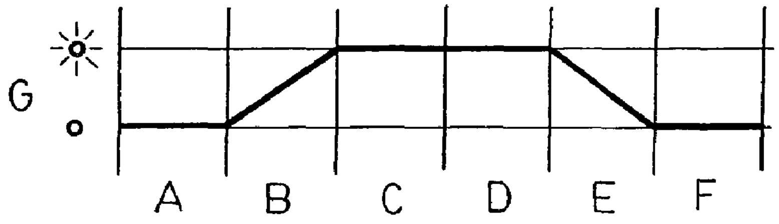
Figure 10:
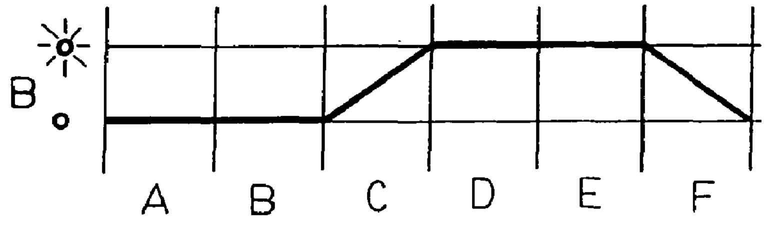

As shown in FIGS. 8-10, illustrated is another flashing mode of the light assembly, in this flashing mode, the red light member 61 may be operated or actuated by the processor device 3 to generate gradually brightening red light, in the first time segment or interval A, the green light member 62 will then be gradually brightened in the second time segment or interval B, and the blue light member 63 will then be gradually brightened in the third time segment or interval C, and the light members 61-63 may generate the lights cyclically.

After the light members 61-63 have been alternatively brightened in the three time segments or intervals A-C, the light members 61-63 may be operated or actuated to generate the lights simultaneously, but the red light member 61 will then be gradually diminished or darkened in the fourth time segment or interval D, the green light member 62 will then be gradually diminished or darkened in the fifth time segment or interval E, and the blue light member 63 will then be gradually diminished or darkened in the sixth time segment or interval F, and then generate the lights cyclically.

Figure 11:
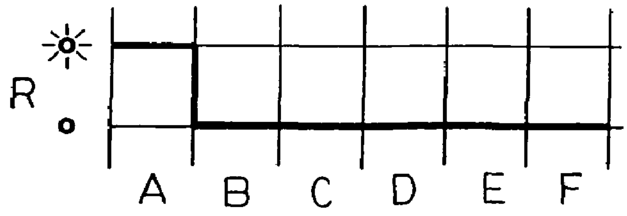
FIGS. 11, 12, 13 are plan schematic views similar to FIGS. 5-7 and 8-10, illustrating the further operation of the light members of the light assembly.
Figure 12:
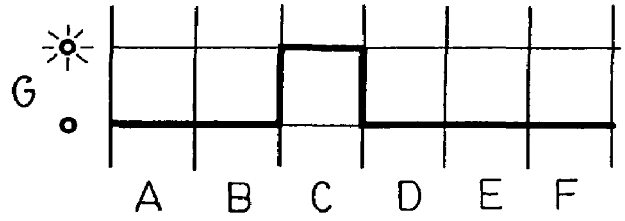
Figure 13:
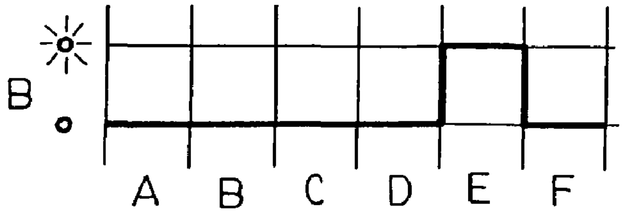

As shown in FIGS. 11-13, illustrated is a further flashing mode of the light assembly, in this flashing mode, the red light member 61 may be operated or actuated by the processor device 3 to generate the red light in and only in the first time segment or interval A, the red light member 61 will then be switched off in the other time segments or intervals, the green light member 62 will be operated or actuated by the processor device 3 to generate the green light in and only in the third time segment or interval C, the green light member 62 will be switched off in the other time segments or intervals, and the blue light member 63 will be actuated to generate the blue light in and only in the fifth time segment or interval E, the blue light member 63 will be switched off in the other time segments or intervals, and the light members 61-63 may generate the lights cyclically.

Figure 14:
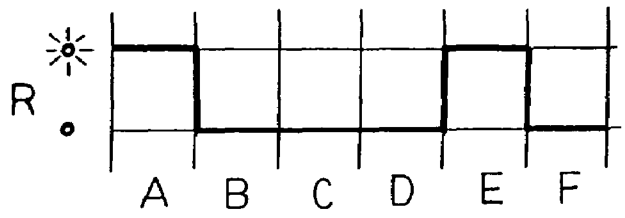
FIGS. 14, 15, 16 are plan schematic views similar to FIGS. 5-7 and 8-10 and 11-13, illustrating the still further operation of the light members of the light assembly.
Figure 15:
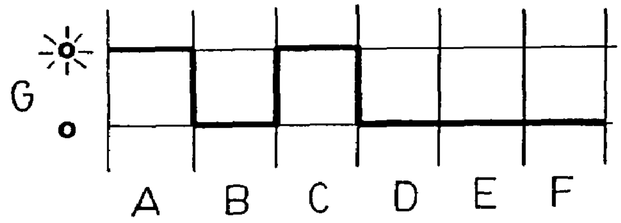
Figure 16:
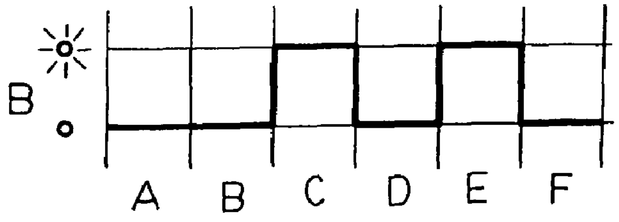

As shown in FIGS. 14-16, illustrated is a still further flashing mode of the light assembly, in this flashing mode, the red light member 61 and the green light member 62 may be simultaneously actuated to generate the red light and the green light in the first time segment or interval A and then may be switched off, the green light member 62 and the blue light member 63 will then be simultaneously actuated to generate the green light and the blue light in the third time segment or interval C and then may be switched off, and the blue light member 63 and the red light member 61 will then be simultaneously actuated to generate the blue light and the red light in the fifth time segment or interval E and will then be switched off, and the light members 61-63 may generate the lights cyclically.

Accordingly, the light assembly in accordance with the present invention includes a light control or changing device or structure for controlling or actuating the light assembly to generate various light colors and/or to generate various light flashing or emitting modes or processes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A light assembly comprising:

a housing, at least one battery disposed in said housing, a processor device including two power terminals (VDD, VSS) for coupling to said at least one battery and for receiving an electric energy from said at least one battery, and including a switch terminal (SW) and a key terminal (KEY), and including three light terminals (RL, GL, BL), a light device coupled to said at least one battery for being energized by said at least one battery, said light device including a red light member, a green light member, and a blue light member coupled to said three light terminals (RL, GL, BL) of said processor device respectively for being operated by said processor device to generate red light, green light, and blue light respectively, wherein the red light member, the green light member, and the blue light member are encapsulated within a single package, a switch selectively coupled to either said switch terminal (SW) or said key terminal (KEY) of said processor device for actuating said light device to generate, gradually darkened, or gradually brighten the red, green, and/or blue light within the single package, so as to bring an effect of mixed light and varied color, wherein when the switch is coupled to said switch terminal (SW), the processor device actuates said light device to sequentially generate flashing lights, intermittent flashing lights, lights gradually darkening and lights gradually brightening in response to the conduction state of the switch, and when the switch is coupled to said key terminal (KEY), the processor device actuates said light device to selectively generate flashing lights, intermittent flashing lights, lights gradually darkening or lights gradually brightening in response to the conduction state of the switch, and a light guiding device attached onto said single package for refracting the lights generated by said single package, wherein said processor device includes an oscillating input terminal (OSCI) and an oscillating output terminal (OSCO), the processor device actuates said light device at a first predetermined speed when only a resistor is coupled between said oscillating input terminal and said oscillating output terminal, the processor device actuates said light device at a second predetermined speed when only a capacitor is coupled to said oscillating input terminal of said processor device, and the processor device actuates said light device at a third predetermined speed when no electrical element is coupled to said oscillating input terminal and said oscillating output terminal, wherein the first predetermined speed is faster than the third predetermined speed, and the third predetermined speed is faster than the second predetermined speed.

2. The light assembly as claimed in claim 1, wherein said red light member, said green light member and said blue light member of said light device are each coupled to said light terminals (RL, CL, BL) of said processor device with a resistor respectively.

3. The light assembly as claimed in claim 1, wherein said light guiding device includes at least one light tube attached onto said light device for refracting the lights.

4. The light assembly as claimed in claim 1, wherein said light guiding device includes a plurality of light tubes attached onto said light device and extended radially from said light device for refracting the lights.

5. A light assembly comprising:

a housing, at least one battery disposed in said housing, a processor device including two power terminals (VDD, VSS) for coupling to said at least one battery and for receiving an electric energy from said at least one battery, and including a switch terminal (SW) and a key terminal (KEY), and including three light terminals (RL, GL, BL), a light device coupled to said at least one battery for being energized by said at least one battery, said light device including a red light member, a green light member, and a blue light member coupled to said three light terminals (RL, CL, BL) of said processor device respectively for being operated by said processor device to generate red light, green light, and blue light respectively, wherein the red light member, the green light member, and the blue light member are encapsulated within a single package, a switch selectively coupled to either said switch terminal (SW) or said key terminal (KEY) of said processor device for actuating said light device to generate, gradually darken, or gradually brighten the red, green, and/or blue light within the single package, so as to bring an effect of mixed light and varied color, wherein the processor device actuates said light device to selectively generate flashing lights, intermittent flashing lights, lights gradually darkening or lights gradually brightening in response to the conduction state of the switch and the direct connection status between the switch, said key terminal (KEY) and said switch terminal (SW), and a light guiding device attached onto said single package for refracting the lights generated by said single package, wherein said processor device includes an oscillating input terminal (OSCI) and an oscillating output terminal (OSCO), the processor device actuates said light device at a first predetermined speed when only a resistor is coupled between said oscillating input terminal and said oscillating output terminal, the processor device actuates said light device at a second predetermined speed when only a capacitor is coupled to said oscillating input terminal of said processor device, and the processor device actuates said light device at a third predetermined speed when no electrical element is coupled to said oscillating input terminal and said oscillating output terminal, wherein the first predetermined speed is faster than the third predetermined speed, and the third predetermined speed is faster than the second predetermined speed.

* * * * *